(12) United States Patent
Kolte

(10) Patent No.: US 12,612,101 B2
(45) Date of Patent: Apr. 28, 2026

(54) MECHATRONIC SYSTEM FOR STABLE OPERATION OF A NARROW-ENCLOSED VEHICLE

(71) Applicant: Sameer Kolte, Mumbai (IN)

(72) Inventor: Sameer Kolte, Mumbai (IN)

( * ) Notice: Subject to any disclaimer, the term of this patent is extended or adjusted under 35 U.S.C. 154(b) by 100 days.

(21) Appl. No.: 18/406,052

(22) Filed: Jan. 5, 2024

(65) Prior Publication Data

US 2025/0058822 A1 Feb. 20, 2025

(30) Foreign Application Priority Data

Aug. 18, 2023 (IN) .............................. 202321055474

(51) Int. Cl.
| | |
|---|---|
| *B62D 5/04* | (2006.01) |
| *B60G 3/00* | (2006.01) |
| *B62D 1/184* | (2006.01) |
| *B62D 1/20* | (2006.01) |
| *B62D 5/08* | (2006.01) |
| *B62D 6/00* | (2006.01) |
| *B62D 9/02* | (2006.01) |

(52) U.S. Cl.
CPC ............. *B62D 5/0484* (2013.01); *B60G 3/00* (2013.01); *B62D 1/184* (2013.01); *B62D 1/20* (2013.01); *B62D 5/0409* (2013.01); *B62D 5/0463* (2013.01); *B62D 5/08* (2013.01); *B62D 9/02* (2013.01); *B62D 6/003* (2013.01)

(58) Field of Classification Search
None
See application file for complete search history.

(56) References Cited

U.S. PATENT DOCUMENTS

| | | | | | |
|---|---|---|---|---|---|
| 3,601,213 | A | * | 8/1971 | Patin | B62K 5/027 |
| | | | | | D12/112 |
| 3,781,031 | A | * | 12/1973 | Patin | B62D 61/08 |
| | | | | | D12/112 |
| 4,368,796 | A | * | 1/1983 | Patin | B62D 9/02 |
| | | | | | 180/41 |
| 7,648,148 | B1 | * | 1/2010 | Mercier | B62K 5/05 |
| | | | | | 280/5.509 |
| 9,381,940 | B2 | * | 7/2016 | Gale | B60G 21/073 |

(Continued)

FOREIGN PATENT DOCUMENTS

| | | | | | |
|---|---|---|---|---|---|
| CA | 1304693 | C | * | 7/1992 | ............... B62H 1/10 |
| CA | 2920158 | C | * | 3/2018 | ............... B62D 5/04 |

(Continued)

*Primary Examiner* — Kevin R Steckbauer

(57) ABSTRACT

The mechatronic system integrates coaxial planetary gear sets with sun, planet, carrier, and ring gears to drive tilt adjustment and steering functions. A tilt subsystem driven by the rotational motion of the ring gears to adjust the tilt angle of the narrow-enclosed vehicle and a steering subsystem connected to an output shaft and configured to steer the narrow-enclosed vehicle. A first holding device, a second holding device, and a third holding device are selectively engageable to control the rotational motion of the ring gears and the carriers. An electric motor is controlled by an electric control unit to provide torque for adjusting the tilt and steering of the narrow-enclosed vehicle and an actuator subsystem is controlled by the electronic control unit to engage or disengage the first holding device, the second holding device, and third holding device.

12 Claims, 8 Drawing Sheets

(56) References Cited

U.S. PATENT DOCUMENTS

| | | | | |
|---|---|---|---|---|
| 9,555,849 | B1 * | 1/2017 | Abbott | B62K 5/10 |
| 10,023,258 | B2 * | 7/2018 | Abbott | B62K 5/10 |
| 10,435,104 | B2 * | 10/2019 | Abbott | B62K 5/08 |
| 11,052,942 | B2 * | 7/2021 | Doerksen | B62K 5/05 |
| 11,072,389 | B2 * | 7/2021 | Doerksen | B62J 43/28 |
| 11,560,198 | B2 * | 1/2023 | Doerksen | B62J 45/40 |
| 11,591,016 | B2 * | 2/2023 | Doerksen | B62J 7/06 |
| 11,834,130 | B2 * | 12/2023 | Doerksen | B62J 43/28 |
| 12,005,981 | B2 * | 6/2024 | Doerksen | B62K 5/027 |
| 2007/0228675 | A1 * | 10/2007 | Tonoli | B60G 17/015 |
| | | | | 280/5.506 |
| 2008/0238005 | A1 * | 10/2008 | James | B62D 9/02 |
| | | | | 280/5.509 |
| 2011/0148052 | A1 * | 6/2011 | Quemere | B60G 21/073 |
| | | | | 280/6.15 |
| 2014/0312580 | A1 * | 10/2014 | Gale | B62D 9/02 |
| | | | | 280/5.509 |
| 2017/0008591 | A1 * | 1/2017 | Abbott | B62K 5/08 |
| 2017/0334502 | A1 * | 11/2017 | Abbott | B62K 5/10 |
| 2018/0334213 | A1 * | 11/2018 | Abbott | B62K 5/08 |
| 2020/0269916 | A1 * | 8/2020 | Doerksen | B62D 9/02 |
| 2020/0283092 | A1 * | 9/2020 | Doerksen | B62M 6/50 |
| 2021/0354781 | A1 * | 11/2021 | Doerksen | B62M 6/50 |
| 2022/0097763 | A1 * | 3/2022 | Doerksen | B62K 5/06 |
| 2023/0234672 | A1 * | 7/2023 | Doerksen | B62J 45/40 |
| | | | | 280/124.103 |
| 2023/0294766 | A1 * | 9/2023 | Doerksen | B62J 43/16 |
| | | | | 280/124.103 |
| 2024/0085574 | A1 * | 3/2024 | Fay | G01S 19/49 |
| 2025/0058822 | A1 * | 2/2025 | Kolte | B60G 3/00 |

FOREIGN PATENT DOCUMENTS

| | | | | |
|---|---|---|---|---|
| DE | 4035128 | A1 * | 6/1992 | B60G 17/033 |
| DE | 102018132596 | A1 * | 6/2020 | B60K 17/354 |
| DE | 102018132596 | B4 * | 7/2020 | B60K 17/354 |
| EP | 0004230 | A1 * | 9/1979 | B62D 37/04 |
| EP | 0004230 | B1 * | 4/1982 | B60G 17/01925 |
| EP | 2729351 | | 5/2014 | |
| EP | 2729351 | B1 * | 5/2016 | B62K 5/10 |
| EP | 3670299 | A1 * | 6/2020 | B62D 9/02 |
| EP | 3670299 | B1 * | 8/2021 | B60K 17/356 |
| ES | 2895140 | T3 * | 2/2022 | B60K 17/354 |
| GB | 2476807 | A * | 7/2011 | B62K 25/18 |
| GB | 2476807 | B * | 10/2012 | B62D 9/02 |
| GB | 2492757 | A * | 1/2013 | B60G 21/106 |
| KR | 101614701 | | 4/2016 | |
| KR | 101614701 | B1 * | 4/2016 | B62D 1/187 |
| WO | WO-7900686 | A1 * | 9/1979 | B60G 17/01925 |
| WO | WO-9961302 | A1 * | 12/1999 | B62K 5/027 |
| WO | WO-2013005007 | A1 * | 1/2013 | B62K 21/00 |

* cited by examiner

| | Holding mechanism 150 | Holding mechanism 250 | Holding mechanism 53 |
|---|---|---|---|
| Off | Engaged | Engaged | Engaged |
| Power tilt | Engaged | Disengaged | Disengaged |
| Power steer | Disengaged | Engaged | Disengaged |
| Faulted | Engaged | Disengaged | Engaged |

FIG. 4

|  | Valve 54.1.1 | Valve 54.1.2 | Valve 54.1.3 | Valve 54.1.4 | Valve 53 |
|---|---|---|---|---|---|
| Off | Normally open | Normally open | Normally open | Normally closed | Normally open |
| Power tilt | Active closed | Normally open | Normally open | Normally closed | Active closed |
| Power steer | Normally open | Active closed | Active closed | Active open | Active closed |
| Faulted | Normally open | Normally open | Normally open | Normally closed | Normally open |

FIG. 5

MECHATRONIC SYSTEM FOR STABLE OPERATION OF A NARROW-ENCLOSED VEHICLE

FIELD OF INVENTION

The present invention relates to a mechatronic system for stable operation of a narrow-enclosed vehicle. More particularly, the present invention relates to a system that enables the stable operation of a narrow-enclosed vehicle by providing control over the vehicle's tilt and steering, thereby ensuring safe and efficient maneuverability at various speeds.

BACKGROUND OF THE INVENTION

In recent years, there has been an increased demand for vehicles with a smaller footprint due to traffic congestion, parking shortages in urban areas, and the need for higher fuel economy. As a result, the number of owners of two-wheeled vehicles, such as motorcycles, has risen. However, while two-wheelers offer a smaller footprint, they do not provide the same level of safety as four-wheelers and lack protection from adverse weather conditions. To address these concerns, the development of narrow-enclosed vehicles with three or more wheels, capable of carrying one or two passengers sitting in tandem, has been considered as an effective design to provide safety with a smaller footprint.

One of the key challenges faced by narrow-enclosed vehicles is the maintenance of stability while cornering. Due to their narrow design, these vehicles have a limited track width, which restricts the maximum moment they can generate to counteract centrifugal forces during turns. To achieve stability, similar to riding a two-wheeler, the narrow-enclosed vehicle needs to be tilted in the direction of the turn, enabling the centrifugal moment to be balanced by the moment generated by the weight of the vehicle.

At low speeds, such as when the rider is performing parking maneuvers, the centrifugal forces are relatively low, the rider of a conventional two-wheeler steers the vehicle in the desired direction while using their legs on the ground to maintain balance. If the rider wishes to balance the tilt of the vehicle without relying on their legs, continuous steering adjustments are required to keep the wheels aligned with the center of gravity, effectively minimizing the tilt moment due to the weight of the body. However, in an enclosed vehicle, the rider cannot extend their legs outside the vehicle for balancing purposes.

As the speed of the vehicle increases, the rider initiates a turn by counter-steering, which involves steering the wheel in the opposite direction of the desired turn. This action causes the vehicle to yaw in the opposite direction but creates a centrifugal force that pushes the vehicle to lean in the desired direction of the turn. Once the vehicle starts leaning toward the desired direction, the rider steers the vehicle in the opposite direction to achieve a yaw rate that balances the centrifugal moment with the weight moment.

GB2476807A discloses a vehicle consisting of a chassis, front and rear wheels, and a propulsion unit. The rear wheels are connected to the chassis through a wheel support assembly, including a hydraulic cylinder. The hydraulic cylinder has a housing and a movable piston, dividing it into two chambers with ports for hydraulic fluid. The interconnected chambers enable fluid movement and cause opposing piston displacement, allowing the chassis to articulate. A pump arrangement controls the hydraulic fluid movement.

EP2729351B1 discloses a vehicle including a chassis, front and rear wheels, and a propulsion unit. The front and rear wheels can tilt with the chassis and are connected through a front wheel support assembly with hydraulic cylinders. The hydraulic cylinders have chambers with ports, and a pump arrangement enables fluid movement between the chambers. This allows the pistons to move in opposing directions, causing the vehicle to tilt.

KR101614701B1 discloses a tilting apparatus for a vehicle. It includes the following components: a sun gear connected to a steering shaft, multiple planetary gears that mesh with the sun gear, a carrier that holds the planetary gears, a ring gear that engages with the planetary gears, a tilting gear portion that adjusts the tilting angle of a tilting shaft by engaging with the carrier, and a connection rod connecting the rotation axis of the sun gear and the rack bar. This apparatus allows for the adjustment of the vehicle's tilting angle.

Various prior art solutions have been proposed to address the challenges of stability and tilt control in narrow-enclosed vehicles. Some of these solutions connect the driver's input directly to the steerable wheel and utilize a tilt actuator to control the vehicle's tilt. However, these systems often suffer from delays in calculating and implementing the desired tilt, resulting in excessive power consumption. Additionally, separate mechanisms may be required to lock the vehicle's tilt during low-speed operations.

Therefore, there is a need for an improved mechatronic system that enables stable operation of narrow-enclosed vehicles over their entire speed range while addressing the challenges associated with stability, tilt control, and power consumption. The present invention aims to fulfill this need by providing a comprehensive mechatronic system that ensures stable operation, enhanced safety, reduced power consumption, and adaptability to different vehicle configurations.

SUMMARY OF THE INVENTION

In light of the disadvantages mentioned in the previous section, the following summary is provided to facilitate an understanding of some of the innovative features unique to the present invention and is not intended to be a full description. A full appreciation of the various aspects of the invention can be gained by taking the entire specification and drawings as a whole. Embodiments described herein disclose a mechatronic system for stable operation of a narrow-enclosed vehicle.

According to an embodiment of the present invention, the mechatronic system for stable operation of the narrow-enclosed vehicle, comprises a steering column configured to receive torque input from a driver, a pair of coaxial planetary gear sets comprising a sun gear, a carrier, a planet gear, and a ring gear, a tilt subsystem driven by the rotational motion of the ring gears to adjust the tilt angle of the narrow-enclosed vehicle, a steering subsystem connected to an output shaft and configured to steer the narrow-enclosed vehicle, a first holding device and a second holding device selectively engageable to control the rotational motion of the ring gears and the carriers. Further, an electric motor controlled by an electric control unit to provide torque for adjusting the tilt and steering of the narrow-enclosed vehicle and an actuator subsystem controlled by the electronic control unit to engage or disengage the first holding device and the second holding device.

According to an embodiment of the present invention, the electronic control unit is configured to monitor a plurality of vehicle parameters comprising sensing of the yaw rate, speed, and centrifugal forces acting on the narrow-enclosed vehicle.

According to an embodiment of the present invention, the electronic control unit is configured to control a first spring-loaded solenoid valve, a second spring-loaded solenoid valve, a third spring-loaded solenoid valve and a fourth spring-loaded solenoid valve.

According to an embodiment of the present invention, the actuator subsystem comprises a hydraulic subsystem comprises an electric pump, the first spring-loaded solenoid valve, the second spring-loaded solenoid valve, the third spring-loaded solenoid valve, the fourth spring-loaded solenoid valve and a plurality of fluid lines to control the engagement or disengagement of the first holding device and the second holding device.

According to an embodiment of the present invention, the first holding device and the second holding device are configured to selectively engage or disengage the connection between the ring gear and the carrier.

According to an embodiment of the present invention, the actuator subsystem is configured to engage the first holding device and the second holding device when the mechatronic system is powered off, thereby locking the tilt subsystem of the vehicle and preventing torque input to the steering column.

According to an embodiment of the present invention, the actuator subsystem is controlled by the electronic control unit to disengage the second holding device and engage the first holding device when the mechatronic system is powered on, enabling a power-tilt mode, wherein the electric motor tilts the narrow-enclosed vehicle.

According to an embodiment of the present invention, the electronic control unit activates the actuator subsystem to disengage the first holding device and engage the second holding device when the vehicle speed exceeds a predetermined threshold, enabling a power-steer mode, wherein the electronic control unit is configured to interpret the driver's torque input and control the electric motor to steer the vehicle to simultaneously achieve the desired turn and the desired tilt.

According to an embodiment of the present invention, in the event of the mechatronic system failure, the first holding device defaults back to the engaged state, thereby locking the narrow-enclosed vehicle's tilt, and the second holding device remains engaged.

According to an embodiment of the present invention, the electrical control unit is configured to control the electric motor based on the torque inputs from the driver and data from the plurality of the sensors, to tilt and steer the narrow-enclosed vehicle.

According to an embodiment of the present invention, wherein a third holding device selectively connects or disconnects the driver to the actuator subsystem.

According to another embodiment of the present invention, a worm gear and the ring gear form a self-locking pair. Further, the mechatronic system comprises a reservoir to store fluid.

This summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way.

BRIEF DESCRIPTION OF THE DRAWING

FIG. 4 illustrates a table illustrating various operating states of a first holding device, a second holding device, and a third holding device of the mechatronic system according to an embodiment of the present disclosure.

FIG. 5 illustrates a table illustrating various operating states of a plurality of spring-loaded valves of the mechatronic system according to an embodiment of the present disclosure.

DETAILED DESCRIPTION OF THE DRAWINGS

Figure 1:
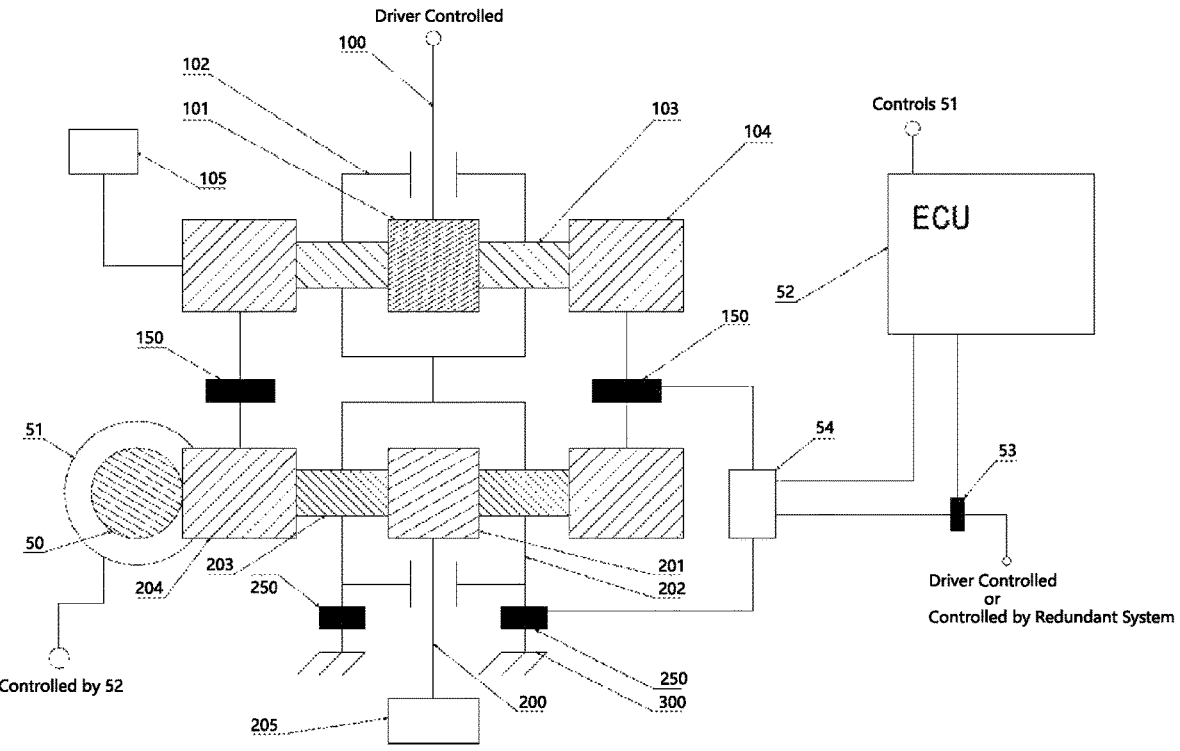
FIG. 1 illustrates a block diagram of an embodiment of a mechatronic system for the stable operation of a narrow-enclosed vehicle according to an embodiment of the present disclosure.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

Embodiments of the present disclosure relate to a mechatronic system for stable operation of a narrow-enclosed vehicle. The mechatronic system comprises of a steering column (100) configured to receive torque input from a driver. A pair of coaxial planetary gear sets comprising a sun gear (101, 201), a carrier (102, 202), a planet gear (103, 203), and a ring gear (104, 204). A tilt subsystem (105) driven by the rotational motion of the ring gears (104) to adjust the tilt angle of the narrow-enclosed vehicle and a steering subsystem (205) connected to an output shaft (200) and configured to steer the narrow-enclosed vehicle. A first holding device (150) and a second holding device (250) selectively engageable to control the rotational motion of the ring gears (104, 204) and the carriers (102, 202). A third holding device (53) selectively connects or disconnects the driver to the actuator subsystem (54). An electric motor (51) is controlled by an electric control unit (52) to provide torque for adjusting the tilt and steering of the narrow-enclosed vehicle and an actuator subsystem (54) is controlled by the electronic control unit (52) to engage or disengage the first holding device (150) and the second holding device (250).

According to an embodiment of the present invention, the electronic control unit (52) comprising one or more sensing elements is configured to monitor a plurality of vehicle parameters comprising sensing of the yaw rate, speed, and centrifugal forces acting on the narrow-enclosed vehicle.

According to an embodiment of the present invention, the electronic control unit (52) is configured to control a first spring-loaded solenoid valve, (54.1.1), a second spring-loaded solenoid valve (54.1.2), a third spring-loaded solenoid valve (54.1.3) and a fourth spring-loaded solenoid valve (54.1.4).

According to an embodiment of the present invention, the actuator subsystem (54) comprises a hydraulic subsystem (54.1) comprises an electric pump (54.1.6), the first spring-loaded solenoid valve, (54.1.1), the second spring-loaded solenoid valve (54.1.2), the third spring-loaded solenoid valve (54.1.3), the fourth spring-loaded solenoid valve (54.1.4), reservoir (54.1.5) and a plurality of fluid lines to control the engagement or disengagement of the first holding device (150) and the second holding device (250).

According to an embodiment of the present invention, the electronic control unit (52) is also configured to control the electric pump (54.1.6) of the actuator subsystem (54).

According to an embodiment of the present invention, the first holding device (150) and the second holding device (250) are configured to selectively engage or disengage the connection between the ring gear (104, 204) and the carrier (102, 202).

According to an embodiment of the present invention, the first holding device (150) is configured to connect and disconnect the ring gears (104, 204) together. On the other hand, the second holding device (250) is designed to connect or disconnect the carrier (202) to the stationary ground. It is pertinent to note that the carriers (102, 202) are rigidly connected to each other.

According to an embodiment of the present invention, the actuator subsystem (54) is configured to engage the first holding device (150) and the second holding device (250) when the mechatronic system is powered off, thereby locking the tilt subsystem (105) of the vehicle and preventing driver's torque input from reaching the steering column (100).

According to an embodiment of the present invention, the actuator subsystem (54) is controlled by the electronic control unit (52) to disengage the second holding device (250) and engage the first holding device (150) when the mechatronic system is powered on, enabling a power-tilt mode, wherein the electric motor (51) tilts the narrow-enclosed vehicle.

According to an embodiment of the present invention, the electronic control unit (52) activates the actuator subsystem (54) to disengage the first holding device (150) and engage the second holding device (250) when the vehicle speed exceeds a predetermined threshold, enabling a power-steer mode, wherein the electronic control unit (52) is configured to interpret the driver's torque input and control the electric motor to steer the vehicle to simultaneously achieve the desired turn and the desired tilt.

According to an embodiment of the present invention, in the event of the mechatronic system failure in power steer mode, the first holding device (150) defaults back to the engaged state, thereby locking the narrow-enclosed vehicle's tilt, and the second holding device (250) remains engaged.

More specifically, in the event of the system failure that prevents safe operation of the vehicles in the Power-steer mode, such as but not limited to power failures, motor failures, ECU failures, and the like, certain actions are taken to ensure the vehicle's stability and safety. Firstly, the first holding device (150) defaults back to the engaged state, effectively locking the vehicle's tilt. Additionally, the second holding device (250) remains engaged, connecting the carriers (102) and (202) to the stationary housing (300). While the stationary and locked carriers may prevent the driver from steering the vehicle, the third holding device (53) also defaults back to the engaged state, ensuring that the driver remains connected to the actuator subsystem (54).

Similarly, if a system failure occurs in the Power-tilt mode, both the first holding device (150) and the second holding device (250) defaults back to their engaged states, locking the tilt subsystem (105) of the vehicle. In either case, both the holding devices go to their engaged states, and this is where the third holding device (53) comes into the picture, allowing the driver to manually disengage the second holding device (250) through the actuator subsystem (54), enabling the motion of the carriers (102) and (202). This allows the driver to steer the vehicle manually to a safe location.

According to an embodiment of the present invention, the electrical control unit (52) is configured to control the electric motor (51) based on the torque inputs from the driver and data from the plurality of the sensors to tilt and steer the narrow-enclosed vehicle.

According to another embodiment of the present invention, a worm gear (50) and the ring gear (204) form a self-locking pair. Further, the mechatronic system comprises the reservoir (54.1.5) to store fluid.

FIG. 1 illustrates a block diagram of an embodiment of a mechatronic system for the stable operation of a narrow-enclosed vehicle according to an embodiment of the present disclosure. In one embodiment, the system comprises the sun gear (201) that drives the steering subsystem (205) via an output shaft (200). The steering subsystem (205) is responsible for steering the narrow-enclosed vehicle through steerable wheels. The set of planet gears (203) meshes with the sun gear (201) and the ring gear (204). Similar to the aforementioned, the other pair of the coaxial planetary gear set comprising the planet gears (103) rotate freely about their own axis within bearings housed in the carrier (102).

The teeth on the outer rim of the ring gear (204) engage with a worm (50). The worm (50) has a single start with a low thread angle, ensuring that the worm (50) can drive the ring gear (204) but the ring gear (204) cannot drive the worm (50). As a result, the worm-ring pair is self-locking. According to an embodiment of the present invention, the electric motor (51) is configured to drive the worm (50), wherein the electric motor (51) is a DC motor.

In another aspect of the invention, the carrier (102) and the carrier (202) are rigidly interconnected, ensuring that their rotational speeds are constantly equal. The planet gears (103) and (203) have the capability to rotate independently about their respective axes. The mechatronic system further comprises the first holding device (150) with two states comprising engaged and disengaged. When in the engaged state, the first holding device (150) establishes a connection between the rings (104) and (204), resulting in equal rotational speeds. Conversely, when the first holding device (150) is disengaged, the rings (104) and (204) are allowed to rotate independently about their own axes.

Similarly, the second holding device (250) comprises two states involving engaged and disengaged. When the second holding device (250) is engaged, it connects the carrier (202) to a stationary housing (300), effectively immobilizing the carrier (202) and preventing its rotation. On the other hand, when the second holding device (250) is disengaged, the carrier (202) is free to rotate about its axis. Both the first and second holding devices (150) and (250) are designed in such a way that they default to the engaged state when not actively controlled by the electronic control unit (ECU) (52) through the actuator subsystem (54).

Additionally, the actuator subsystem (54) incorporates a feature that enables the driver to manually disengage the second holding device (250). Furthermore, a third holding device (53) is included, which, depending on its engaged or disengaged state, establishes a connection or disconnection between the driver and the actuator subsystem (54), respectively. The holding device (53) is designed to default to the engaged state when not actively controlled by the electronic control unit (ECU) (52).

Figure 2:
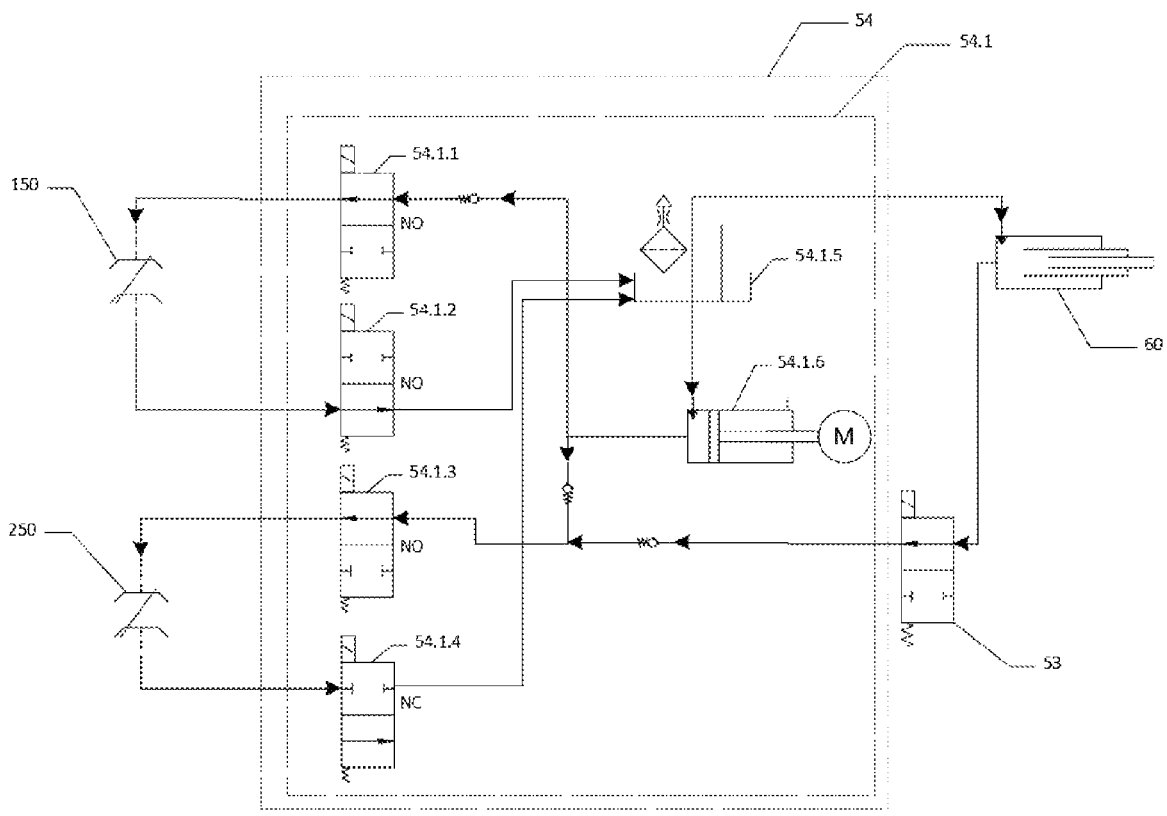
FIG. 2 illustrates a block diagram of an actuator subsystem of the mechatronic system according to an embodiment of the present disclosure.

FIG. 2 illustrates a block diagram of an actuator subsystem of the mechatronic system according to an embodiment of the present disclosure. In a particular embodiment, the actuator subsystem (54) is configured as a hydraulic system (54.1). The hydraulic system comprises an electric pump (54.1.6) that draws fluid from a reservoir (54.1.5). The pressurized fluid is directed to the first and second holding devices (150) and (250) through a first spring-loaded solenoid valve (54.1.1) and a third spring-loaded solenoid valve (54.1.3), respectively. The fluid returning from the holding devices is guided back to the reservoir through a second spring-loaded solenoid valve (54.1.2) and a fourth spring-loaded solenoid valve (54.1.4).

The first, second, and third spring-loaded solenoid valves (54.1.1), (54.1.2), and (54.1.3) are normally open valves that are held open by the spring load, and they close when the ECU (52) activates their respective solenoids. Conversely, the fourth solenoid valve (54.1.4) is a normally closed valve that is held closed by the spring load and opens when the ECU (52) activates its solenoid.

In this configuration, the third holding device (53) is implemented as another spring-loaded solenoid valve that is normally open. It allows the driver to disengage the second holding device (250) by sending pressurized fluid using an actuator (60).

According to an embodiment of the present invention, the electronic control unit (ECU) 52 is configured to be responsible for regulating the voltage supply to the electric motor (51). The ECU (52) has the capability to control the engaged or disengaged states of the first and second holding devices 150 and 250 by managing the various components of the actuator subsystem (54). Additionally, the ECU (52) can disengage the third holding device (53) through an actuator mechanism.

In the illustrated embodiment shown in FIG. 2, the ECU (52) specifically controls the electric pump (54.1.6), the first, second, third, and fourth spring-loaded solenoid valves (54.1.1, 54.1.2, 54.1.3 and 54.1.4), and the third holding device (53). The ECU (52) incorporates one or more sensing elements that are capable of measuring parameters such as the torque exerted by the driver, the rotational speed of the steering column (100), the rotational speed and direction of the electric motor (51), as well as the speed, accelerations, and angular rates of the narrow-enclosed vehicle. Utilizing this information, the ECU (52) determines the orientation of the narrow-enclosed vehicle, including parameters such as tilt, yaw, and pitch.

According to an embodiment of the present invention, the one or more sensing elements comprises a plurality of sensors such as but not limited to a torque sensor, a position sensor, two or more hall sensors, inertial measurement unit (IMU) and a speed sensor. According to an embodiment of the present invention, the torque sensor is used for measuring the torque applied by the driver at the steering column (100). A position sensor is used for measuring the angle and the rotational speed of the steering column (100). The acceleration and angular rates can be measured by using the inertial measurement unit (IMU). Further, the speed of the vehicle can be estimated by the speed sensor at the wheel and in combination with the IMU.

In addition to the components illustrated in the figures, the embodiment further comprises other essential elements that are not depicted. These additional components include a battery for supplying power to electrical components, multiple bearings that facilitate the rotational motion of gears while restricting axial or radial movement, as well as multiple fasteners for securely assembling the various parts of the system. Although not explicitly shown in the figures, these components are integral to the functioning and stability of the embodiment.

Figure 3:
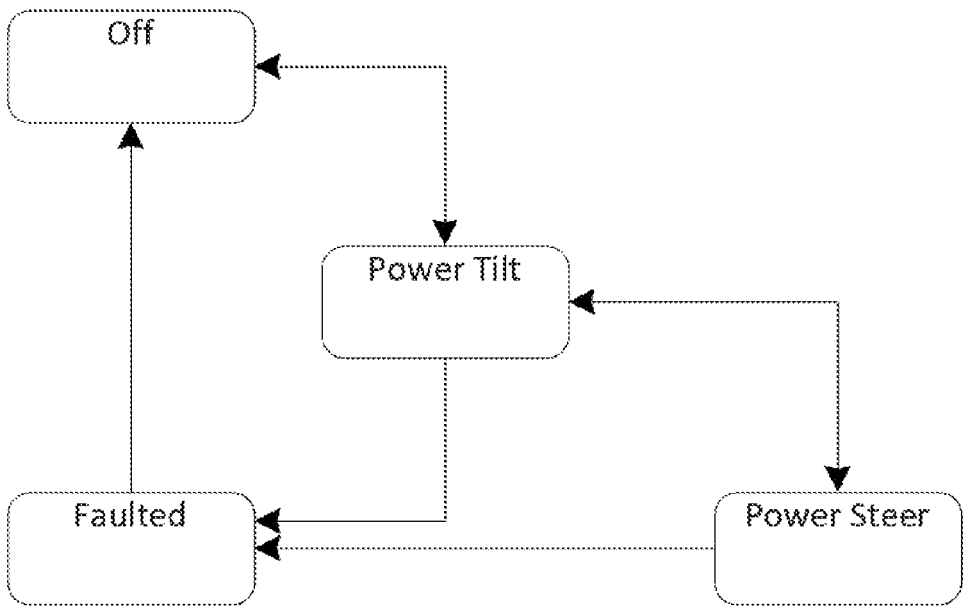
FIG. 3 illustrates a table illustrating various operating states of the mechatronic system according to an embodiment of the present disclosure.

FIG. 3 illustrates a table illustrating various operating states of the mechatronic system according to an embodiment of the present disclosure. FIG. 4 illustrates a table illustrating various operating states of a first holding device, a second holding device, and a third holding device of the mechatronic system according to an embodiment of the present disclosure.

According to an embodiment of the present invention, when the mechatronic system is in a powered-off state, the first holding device (150) and the second holding device (250) are in their engaged state. Specifically, in the depicted embodiment of the actuator subsystem (54) and the third holding device (53) as shown in FIG. 2, the first, second, third and fourth spring-loaded solenoid valves (54.1.1, 54.1.2, 54.1.3 and 54.1.4) assume their normally open or closed positions. The carrier (202) is connected and secured to the stationary housing, maintaining a speed of zero. Moreover, the ring gear (104) and ring gear (204) are interconnected in such a manner that their rotational speeds are equal.

Since the electric motor (51) does not provide any torque when the mechatronic system is powered off and the worm (50)—ring gear (204) pair is self-locking, the ring gear (204) remains locked at zero speed. Consequently, the rotational speed of the ring gear (104) is also zero. The tilt of the vehicle is locked due to the fact that the stationary ring gear (104) does not drive the tilt subsystem (105). As both the ring gears (104) and (204), as well as the carriers (102) and (202), remain locked, the sun gear (101) and sun gear (201) are also held at a speed of zero.

Overall, the mechatronic system remains in a locked state, effectively preventing any steering of the narrow-enclosed vehicle by applying torque through the steering column.

Upon powering on the mechatronic system, the ECU (52) activates the actuator subsystem (54) to place the second holding device (250) in the disengaged state. In the illustrated embodiment of the actuator subsystem (54) and the third holding device (53) shown in FIG. 2, the ECU (52) closes the first spring-loaded solenoid valve (54.1.1), while the fourth spring-loaded solenoid (valve) 54.1.4 remains normally closed. This configuration allows the pressurized fluid from the electric pump (54.1.6) to disengage the second holding device (250), thereby enabling rotation of the carrier (202) and the carrier (101) about their shared axis. The first holding device (150), however, remains in its default engaged state.

By applying torque through the electric motor (51), the narrow-enclosed vehicle tilts. The power transmission follows the path of the worm (50), the ring gear (204), the first holding device (150), the ring gear (104), and the tilt subsystem (105). The self-locking nature of the ring gear (204) and the worm (50) pair restrains the tilt when the ECU (52) does not command motor torque. This operational mode is referred to as the 'Power-tilt' mode, which the ECU (52) maintains at low speeds.

The driver's input through the steering column (100) drives the sun gear (101). The rotation of the sun gear (101) in turn propels the planet gear (103), causing the rotation of carriers (102) and (202). The carrier (202) drives the sun gear (201) through the rotation of planet gear (203) about their own axes and the axis of the sun gear (201). The sun gear (201), in turn, imparts motion to the steering subsystem (205). Thus, the driver's steering input is transferred to the steering subsystem (205). Due to the locked tilt, the driver can manoeuvre the vehicle without the need to balance the tilt.

In certain situations, the ECU (52) can command motor torque to achieve a specific tilt angle in order to balance small centrifugal forces generated during low-speed cornering. In an embodiment, the torque/speed ratio between the steering column (100) and the output shaft (200) depends on the number of teeth on the sun gears (101, 201), the planet gears (103, 203), and ring gears (104, 204) of each planetary gear set, as well as the rotational speed of the motor-driven ring gears. When both the coaxial planetary gear sets have identical gear teeth and the ring gears (104, 204) are stationary, the torque/speed ratio between the steering column (100) and the output shaft (200) is equal to 1.

FIG. 5 illustrates a table illustrating various operating states of a plurality of spring-loaded valves of the mechatronic system according to an embodiment of the present disclosure. Once the vehicle's speed exceeds a predetermined threshold, the ECU (52) activates the actuator subsystem (54) to transition the mechatronic system into the 'Power-steer' mode. In the depicted embodiment of the actuator subsystem (54) and the third holding device (53) shown in FIG. 2, the ECU (52) closes the second and third spring-loaded solenoid valves (54.1.2) and (54.1.3), while opening the fourth spring-loaded solenoid valve (54.1.4). By closing the second spring-loaded solenoid valve (54.1.2), the pressurized fluid from the electric pump (54.1.6) disengages the first holding device (150). Simultaneously, as the fourth spring-loaded solenoid valve (54.1.4) is opened, the fluid flows back from the second holding device (250) to the reservoir (54.1.5), returning the second holding device (250) to its engaged state.

As a result, the ring gear (104) and the ring gear (204) are able to rotate independently. The carrier (202) and the carrier (102) become linked to the stationary housing (300), effectively reducing their rotational speed to zero. This configuration represents the 'Power-steer' mode of the system. The fixed carriers (102, 202) prevent the driver from directly controlling the steering subsystem (205), thus eliminating direct steering control by the driver.

In another embodiment involving the 'Power-steer' mode, the ECU (52) assumes control of steering by manipulating the electric motor (51), which drives the worm (50) and the ring gear (204). Consequently, the planet gear (203) of the stationary carrier (202) revolve around their own axes, driving the sun gear (201) connected to the steering subsystem (205). The ECU (52) continuously monitors the driver's torque input to determine the desired amount of steering. By adjusting the electric motor (51), the ECU (52) steers the vehicle in two steps: first, tilting the narrow-enclosed vehicle to counteract the centrifugal force expected during the intended turn, and second, executing the desired turn.

When the driver ceases to apply torque input, the ECU (52) interprets this as the driver's intention to travel in a straight line. In response, the ECU (52) steers the vehicle to maintain a straight trajectory while keeping the vehicle in an upright tilt position. By constantly controlling the steering based on the driver's demand, the mechatronic system rejects external disturbances that may cause tilting, such as side-winds. As a result, the mechatronic system achieves stable operation of the narrow-enclosed vehicle at driving speeds.

During both the 'Power-tilt' and 'Power-steer' modes, the ECU (52) disengages the third holding device 53 through an actuator mechanism. This action serves to disconnect the driver from the actuator subsystem (54). Specifically, in the embodiment shown in FIG. 2, the ECU (52) accomplishes this by closing the valve.

In the event of a system failure that poses a safety risk to the vehicle's operation in the 'Power-steer' mode, such as but not limited to power failures, motor failures, ECU failures, and the like, certain actions are taken to ensure the vehicle's stability and safety. Firstly, the first holding device (150) defaults back to the engaged state, effectively locking the vehicle's tilt. Additionally, the second holding device (250) remains in the engaged state, connecting the carriers (102) and (202) to the stationary housing (300). While the stationary and locked carriers may prevent the driver from steering the vehicle, the third holding device (53) also defaults back to the engaged state, ensuring that the driver remains connected to the actuator subsystem (54).

In this scenario, the driver can manually disengage the second holding device (250) through the actuator subsystem (54), enabling the motion of the carriers (102) and (202). This allows the driver to steer the vehicle while reducing its speed and maneuvering it to a safer position. In the faulted state of the system, the ECU (52) relinquishes control over all the spring-loaded solenoid valves (54.1.1, 54.1.2, 54.1.3 and 54.1.4) in the embodiment shown in FIG. 2, and they all return to their normal state.

By implementing these measures, the system ensures stable and safe operation of the narrow-enclosed vehicle across its entire speed range, even in the presence of failures or faults.

The number of teeth on each gear within the mechatronic system is subject to variation based on various factors including the dimensions of the vehicle, its mass properties, manufacturability considerations, assembly constraints, available packaging space, and the required torque ratio for steering and tilting the narrow-enclosed vehicle. These factors influence the design and selection of the gear teeth configuration to ensure optimal performance and functionality of the system.

The entire arrangement of the mechatronic system can be oriented in any direction as per the packaging constraints within the vehicle. The specific orientation of the components and their spatial arrangement is determined based on factors such as the available space, design requirements, integration with other vehicle systems, and efficient utilization of the vehicle's internal volume. This flexibility allows for the optimal positioning of the system within the vehicle, taking into account various packaging considerations.

In an alternative embodiment, the worm (50)—ring pair (204) can be designed to be non-self-locking, i.e., the worm (50) may not have a single start and may have a larger thread angle. In such a configuration, the mechatronic system may experience a continuous current draw at low speeds to limit the tilt of the vehicle. However, at high speeds, the motion of the steerable wheel is not restricted, and it can rotate freely about the steering axis. This allows for the self-stabilization of the vehicle, as the stabilizing moments exerted on the steerable wheel contribute to maintaining the vehicle's stability. The effectiveness of this self-stabilizing contribution depends on factors such as the mass properties and steering geometry of the vehicle. If this arrangement proves to be effective, it can result in reduced power consumption at high speeds, offering potential benefits in terms of energy efficiency.

Figure 6:
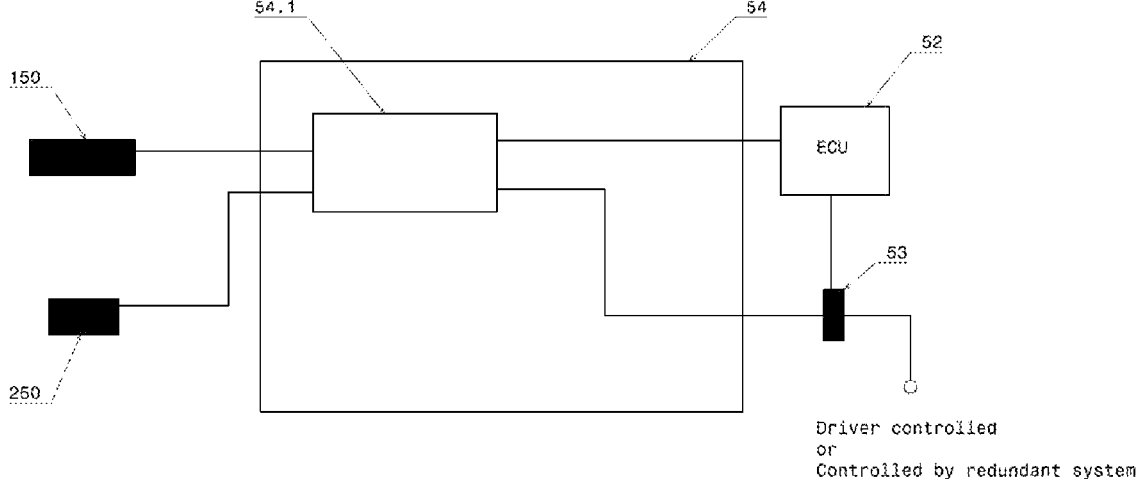
FIG. 6 illustrates a block diagram of an alternative configuration of the actuator subsystem, a first holding device, a second holding device, and a third holding device in the mechatronic system according to an embodiment of the present disclosure.

FIG. 6 illustrates a block diagram of an alternative configuration of the actuator subsystem, a first holding device, a second holding device, and a third holding device in the mechatronic system according to an embodiment of the present disclosure. The first and second holding devices (150, 250) in the system can be implemented as spring-loaded, single, or multi-plate friction clutches. These holding devices are designed to be engaged by default unless specifically disengaged by the ECU (52) through the actuator (54). In one embodiment, the first and second holding devices (150, 250) can be constructed as sliding sleeves with internal splines that mesh with the external splines on the components they are connecting. For example, the first holding device (150) can have internal splines that mesh with the external splines of the ring gears (104, 204), while the second holding device (250) can have internal splines that mesh with the external splines of the carrier (202) and the stationary housing (300). This arrangement allows for a secure and efficient connection between the respective components, enabling the desired functionality of the mechatronic system.

In an alternative configuration of the actuator subsystem (54), the hydraulic system (54.1) can be designed without the inclusion of the first and third spring-loaded solenoid valves (54.1.1, 54.1.3). Instead, the engagement of the first and second holding devices (150, 250) is exclusively accomplished by the operation of the second and fourth spring-loaded solenoid valves (54.1.2, 54.1.4). The fourth spring-loaded solenoid valve (54.1.4) is a normally closed valve, and its default state when not activated by the ECU is 'closed'. By relying solely on the open position of the second spring-loaded solenoid valve (54.1.2) and the closed position of the fourth spring-loaded solenoid valve (54.1.4), the pressurized fluid within the hydraulic system (54.1) is directed to appropriately engage the first and second holding devices (150, 250) facilitating the desired functionality of the system. This configuration provides an alternative approach for achieving the engagement of the first and second holding devices (150, 250) without the need for additional valves in the hydraulic system (54.1).

Figure 7:
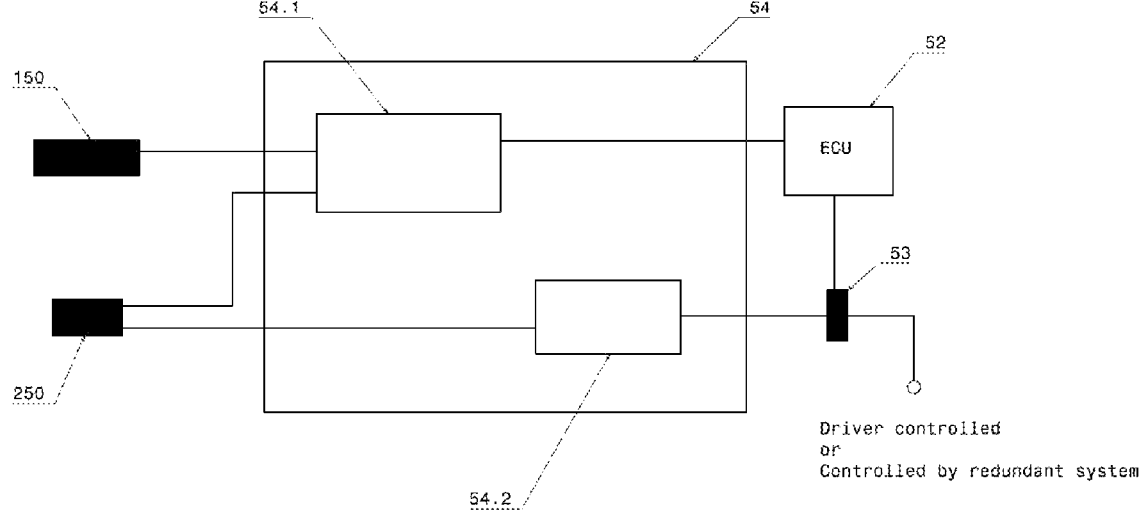
FIG. 7 illustrates a block diagram of an alternative configuration of the actuator subsystem, a first holding device, a second holding device, and a third holding device in the mechatronic system according to an embodiment of the present disclosure.

Within the actuator subsystem (54), there exists a provision for a distinct failsafe subsystem (54.2), which serves the purpose of disengaging the second holding device (250) in a separate manner. This particular configuration is depicted in FIG. 7, illustrating the alternate mechanism followed by the failsafe subsystem (54.2). The failsafe subsystem (54.2) operates independently of the primary actuator subsystem (54.1), ensuring that in the event of specific conditions or failures in 54.1, the second holding device (250) can be disengaged to achieve the intended disconnection. This separate failsafe subsystem (54.2) provides an additional layer of reliability and safety to the overall system, enhancing its robustness during operation.

Figure 8:
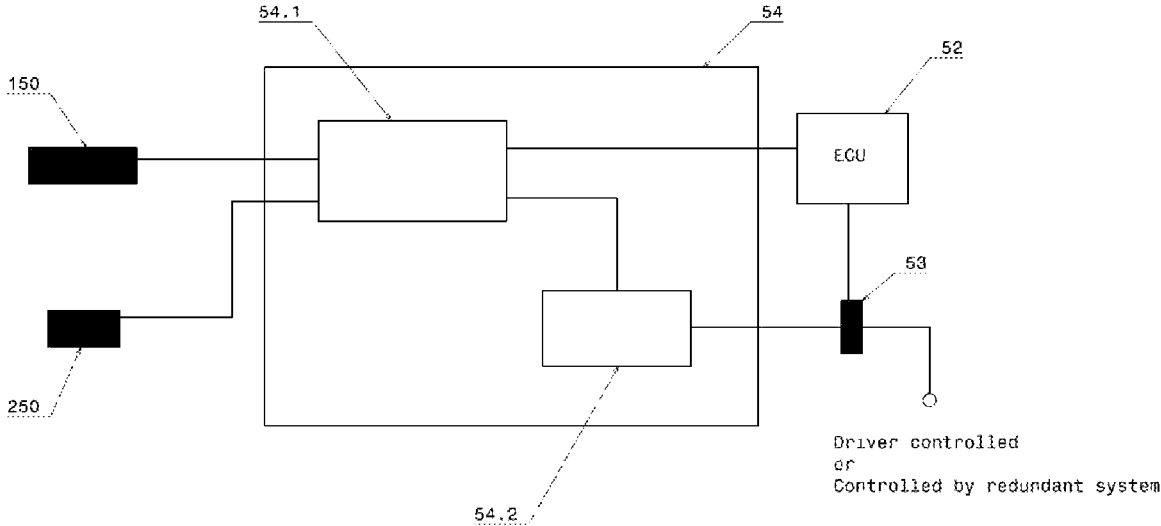
FIG. 8 illustrates a block diagram of another alternative configuration of the actuator subsystem, a first holding device, a second holding device, and a third holding device in the mechatronic system according to an embodiment of the present disclosure.

FIG. 8 illustrates a block diagram of an alternative configuration of the actuator subsystem, a first holding device, a second holding device, and a third holding device in the mechatronic system according to an embodiment of the present disclosure. Within the actuator subsystem (54), there is a distinct failsafe subsystem (54.2), which serves the purpose of disengaging the second holding device (250). This separate failsafe subsystem (54.2) is configured to work in conjunction with the hydraulic subsystem (54.1), as illustrated in the configuration shown in FIG. 8. The failsafe subsystem (54.2) operates independently and employs the components and functionalities of the hydraulic subsystem (54.1) to achieve the disengagement of the second holding device (250). By incorporating this failsafe mechanism, the actuator subsystem (54) enhances the overall safety and reliability of the system, ensuring that the second holding device (250) can be effectively disengaged when necessary, providing an additional layer of protection and mitigating potential risks.

FIG. 8 illustrates a block diagram of another alternative configuration of the actuator subsystem a first holding device, a second holding device, and a third holding device in the mechatronic system according to an embodiment of the present disclosure.

According to an embodiment of the present invention, the actuator subsystem (54) is configured to be integrated into the braking system of the vehicle, functioning as a component thereof. It comprises essential elements such as a pump, a fluid reservoir, multiple valves, and fluid lines. The actuator subsystem (54) is responsible for the effective routing of brake fluid to the first and second holding devices (150, 250), thereby facilitating their engagement or disengagement as required. By leveraging the existing infrastructure of the braking system, the actuator subsystem (54) seamlessly incorporates the necessary functionality to control the operation of the first and second holding devices (150, 250), ensuring efficient and reliable performance.

According to an embodiment of the present invention, the third holding device (53) is configured to be integrated into the braking system of the vehicle, serving as a component thereof. It plays a crucial role in the disengagement of the second holding device (250) in the event of a failure. To achieve this, the third holding device (53) is capable of routing pressurized brake fluid to the actuator subsystem (54). The pressurized brake fluid is directed to the actuator subsystem (54), where it initiates the necessary actions to disengage the second holding device (250), allowing for appropriate vehicle control and maneuvering.

According to an embodiment of the present invention, the actuator subsystem (54) is also configured alternatively to take the form of a lever mechanism, which is operated by a linear or rotary actuator. This lever mechanism possesses the capability to selectively place the holding devices in either an engaged or disengaged state. Further, the electric motor (51), utilized in this embodiment, can be implemented as either a single-phase or a three-phase motor.

In an alternative embodiment, the actuator subsystem (54) can be activated to disengage the second holding device (250) by a redundant system that operates independently of the driver's input. This redundant system is designed to ensure continued functionality in the event of a failure within the nominal embodiment of the system. By employing this redundant system, the second holding device (250) can be disengaged reliably and effectively, providing an additional layer of safety and ensuring the uninterrupted operation of the overall system. Further, in accordance with an embodiment of the present invention, the DC motor (51) can be a single-phase or 3-phase DC motor.

Overall, the present invention enables a narrow-enclosed vehicle to operate smoothly across its entire speed range, ensuring stability throughout. At low speeds, the driver can steer the vehicle effortlessly without additional effort while maintaining stability. The present invention allows the vehicle to tilt in the desired direction first at high speeds, this reduces torque demand, resulting in reduced power consumption and the ability to use a smaller motor with lower torque ratings. Further, similar to conventional 2-wheelers with a front steerable wheel and positive caster angle, the invention achieves a self-stabilizing effect at high speeds.

The system locks the tilt of the vehicle at low speeds, reducing the power consumption required to maintain an upright position. When the motor torque is zero, the self-locking property of the system locks the vehicle tilt in the current position. This reduces power consumption to hold the vehicle tilt in an upright position. It may be appreciated that the present invention can be adapted for a plurality of vehicle configurations with different suspension, steering, and tilt mechanisms by modifying output interfaces and specific design parameters.

Another advantage of the present invention is that it allows the locking of steering when the vehicle is powered off as an additional security measure against vehicle theft.

Furthermore, the present invention is capable of disconnecting the driver from the steering in the power steer mode and allowing the system to take control of the steering and stability based on the driver's preference.

Also, the present invention facilitates safe operation in the event of any electrical malfunction in the system. Furthermore, the system reverts to a minimum risk state by locking the tilt and hands over the steering control to the driver, allowing the driver to steer the vehicle manually to a safe location. Furthermore, the system of the present invention is compact and saves packaging space.

Examples described herein can also be used in various other scenarios and for various purposes. It may be noted that the above-described examples of the present solution are for the purpose of illustration only. Although the solution has been described in conjunction with a specific embodiment thereof, numerous modifications/versions may be possible without materially departing from the instructions and advantages of the subject matter described herein. Other substitutions, modifications, and changes may be made without departing from the spirit of the present solution. All of the features disclosed in this specification (including any accompanying claims, abstract, and drawings), and/or all of the steps of any method or process so disclosed, may be combined in any arrangement, except combinations where at least some of such features and/or steps are mutually exclusive.

The present description has been shown and described with reference to the foregoing examples. It is understood, however, that other forms, details, and examples can be made without departing from the spirit and scope of the present subject matter.

I claim:

1. A mechatronic system for stable operation of a narrow-enclosed vehicle, comprising:

a steering column configured to receive torque input from a driver;

a pair of coaxial planetary gear sets comprising a sun gear, a carrier, a planet gear, and a ring gear;

a tilt subsystem driven by a rotational motion of the ring gears to adjust a tilt angle of the narrow-enclosed vehicle;

a steering subsystem connected to an output shaft and configured to steer the narrow-enclosed vehicle;

a first holding device, a second holding device, and a third holding device selectively engageable to control the rotational motion of the ring gears and the carriers;

an electric motor controlled by an electric control unit to provide torque for adjusting the tilt and steering of the narrow-enclosed vehicle; and an actuator subsystem comprising a failsafe subsystem and a hydraulic subsystem controlled by the electronic control unit to engage or disengage the first holding device, the second holding device, and the third holding device.

2. The mechatronic system as claimed in claim 1, wherein a plurality of sensing elements are configured to monitor a plurality of vehicle parameters comprising sensing of a yaw rate, speed, and centrifugal forces acting on the narrow-enclosed vehicle.

3. The mechatronic system as claimed in claim 1, wherein the electronic control unit is configured to control a first spring-loaded solenoid valve, a second spring-loaded solenoid valve, a third spring-loaded solenoid valve, and a fourth spring-loaded solenoid valve.

4. The mechatronic system as claimed in claim 1, wherein the electronic control unit operates in conjunction with the hydraulic system and is configured to control the engagement and disengagement of the holding devices.

5. The mechatronic system as claimed in claim 1, wherein the actuator subsystem comprises the hydraulic subsystem which comprises an electric pump, a first spring-loaded solenoid valve, a second spring-loaded solenoid valve, a third spring-loaded solenoid valve, a fourth spring-loaded solenoid valve, a fluid reservoir, and a plurality of fluid lines to control the engagement or disengagement of the first holding device and the second holding device.

6. The mechatronic system as claimed in claim 1, wherein the actuator system comprises a first, second, third, and fourth spring-loaded solenoid valves configured to selectively engage or disengage the connections between ring gears and carriers.

7. The mechatronic system as claimed in claim 1, wherein the actuator subsystem is configured to engage the first holding device and the second holding device when the mechatronic system is powered off, thereby locking the tilt subsystem of the vehicle and preventing torque input to the steering column.

8. The mechatronic system as claimed in claim 1, wherein the actuator subsystem is controlled by the electronic control unit to disengage the second holding device and engage the first holding device when the mechatronic system is powered on, enabling a power-tilt mode, wherein the electric motor tilts the narrow-enclosed vehicle.

9. The mechatronic system as claimed in claim 1, wherein the electronic control unit activates the actuator subsystem to disengage the first holding device and engage the second holding device when a vehicle speed exceeds a predetermined threshold, enabling a power-steer mode, wherein the electronic control unit is configured to interpret the driver's torque input and control the electric motor to steer the vehicle to simultaneously achieve a desired turn and a desired tilt.

10. The mechatronic system as claimed in claim 1, wherein in the event of a subsystem failure, the first holding device defaults back to the engaged state, thereby locking the narrow-enclosed vehicle's tilt, while the third holding device disengages the second holding device, and the driver is able to steer the narrow-enclosed vehicle.

11. The mechatronic system as claimed in claim 1, wherein the electronic control unit is configured to control the electric motor based on the torque inputs from the driver and data from a plurality of the sensing elements to tilt and steer the narrow-enclosed vehicle.

12. The mechatronic system as claimed in claim 1, wherein a worm gear and the ring gear form a self-locking pair to automatically engage at low speeds, thereby reducing additional energy requirement to maintain an upright tilt of the narrow-enclosed vehicle.

\* \* \* \* \*